United States Patent [19]

Mathews

[11] 4,306,697
[45] Dec. 22, 1981

[54] CONDUIT SPACER SYSTEM

[76] Inventor: Lyle H. Mathews, P.O. Box 3697, Anaheim, Calif. 92803

[21] Appl. No.: 160,137

[22] Filed: Jun. 16, 1980

[51] Int. Cl.³ .............................................. F16L 3/22
[52] U.S. Cl. ............................... 248/68 CB; 248/74 A
[58] Field of Search ............ 248/68 R, 68 CB, 74 R, 248/74 A, 49; 138/106, 107, 112, 113; 174/96, 37

[56] References Cited

U.S. PATENT DOCUMENTS

| | | | |
|---|---|---|---|
| 3,430,904 | 3/1969 | Soltysik | 248/74 A X |
| 3,437,298 | 4/1969 | Seckerson | 248/74 A X |
| 3,643,005 | 2/1972 | Mathews | 174/96 X |
| 3,765,629 | 10/1973 | Voelker | 248/68 CB |
| 3,856,246 | 12/1974 | Sinko | 248/49 X |
| 3,916,089 | 10/1975 | Sloan | 248/74 A X |
| 3,964,707 | 6/1976 | Lewis | 248/68 CB X |
| 4,019,599 | 4/1977 | Strunk | 248/74 A X |
| 4,099,617 | 7/1978 | Nist | 138/106 X |
| 4,114,241 | 9/1978 | Bisping | 248/68 CB X |
| 4,244,542 | 1/1981 | Mathews | 248/49 |

FOREIGN PATENT DOCUMENTS

| | | | |
|---|---|---|---|
| 1540647 | 6/1969 | Fed. Rep. of Germany | 248/68 R |
| 2819923 | 6/1978 | Fed. Rep. of Germany | 248/74 A |
| 1492552 | 7/1967 | France | 248/68 CB |
| 2385966 | 12/1978 | France | 248/74 A |
| 301672 | 6/1978 | Sweden | 248/68 R |

*Primary Examiner*—J. Franklin Foss
*Attorney, Agent, or Firm*—Philip M. Hinderstein

[57] ABSTRACT

An improved system for supporting a plurality of conduits above another in parallel, spaced-apart relationship including a base unit for supporting the bottom conduit, the base unit comprising a base and a generally U-shaped member having an open end for receiving the bottom conduit and supporting same, and an intermediate unit including first and second U-shaped members, the open ends of which extend in opposite directions whereby an intermediate unit can be pushed down onto one conduit and positioned to support another conduit thereabove. Both the base unit and the intermediate unit include means for guiding conduits into the U-shaped members thereof and means for locking conduits therein after being located. The intermediate unit also comes in modular form to permit interconnecting of different sizes of conduits. Each unit includes matching interlocking means attached to opposite sides thereof whereby adjacent units may be interconnected to support multiple columns of conduits with a desired horizontal spacing.

3 Claims, 7 Drawing Figures

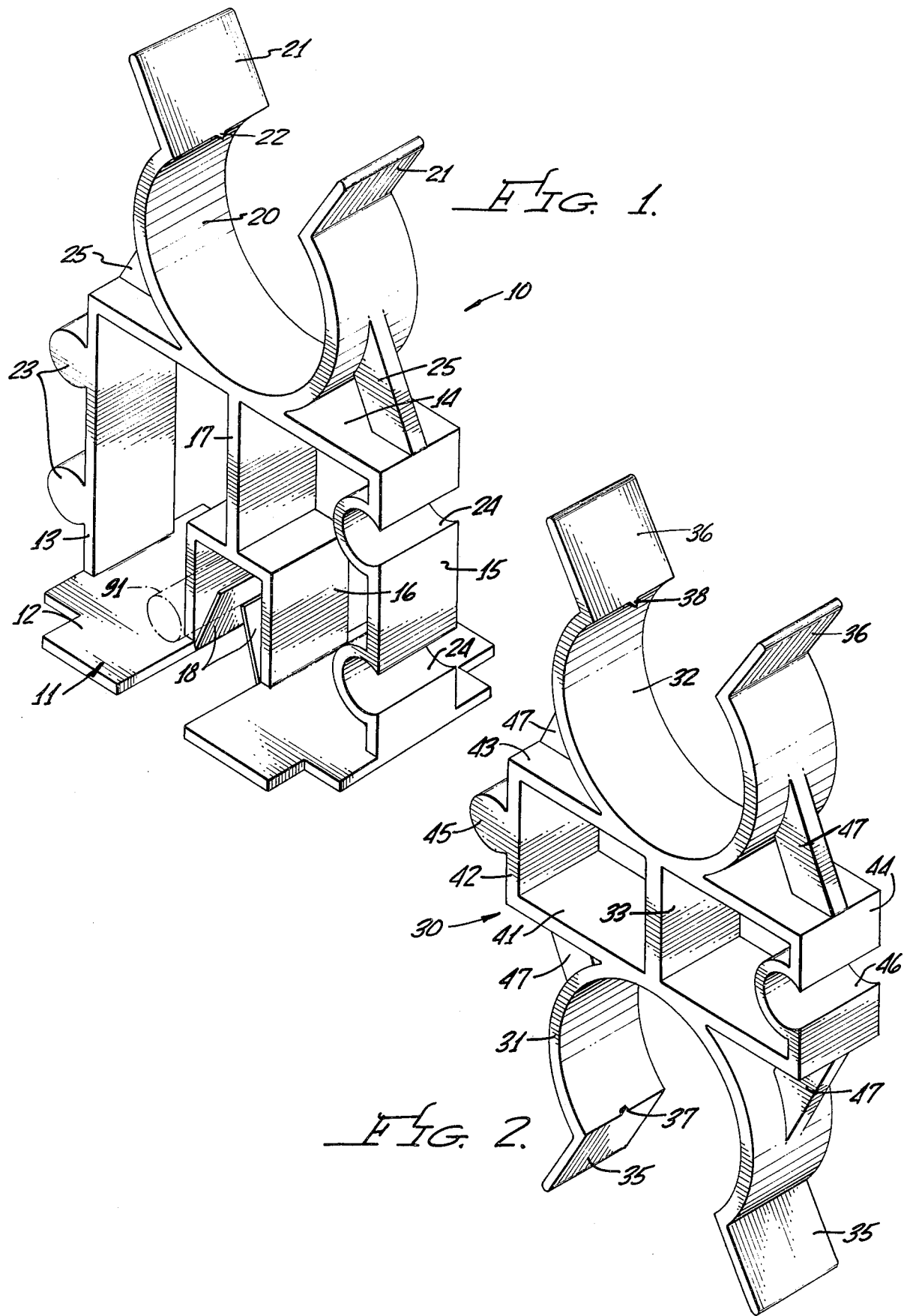

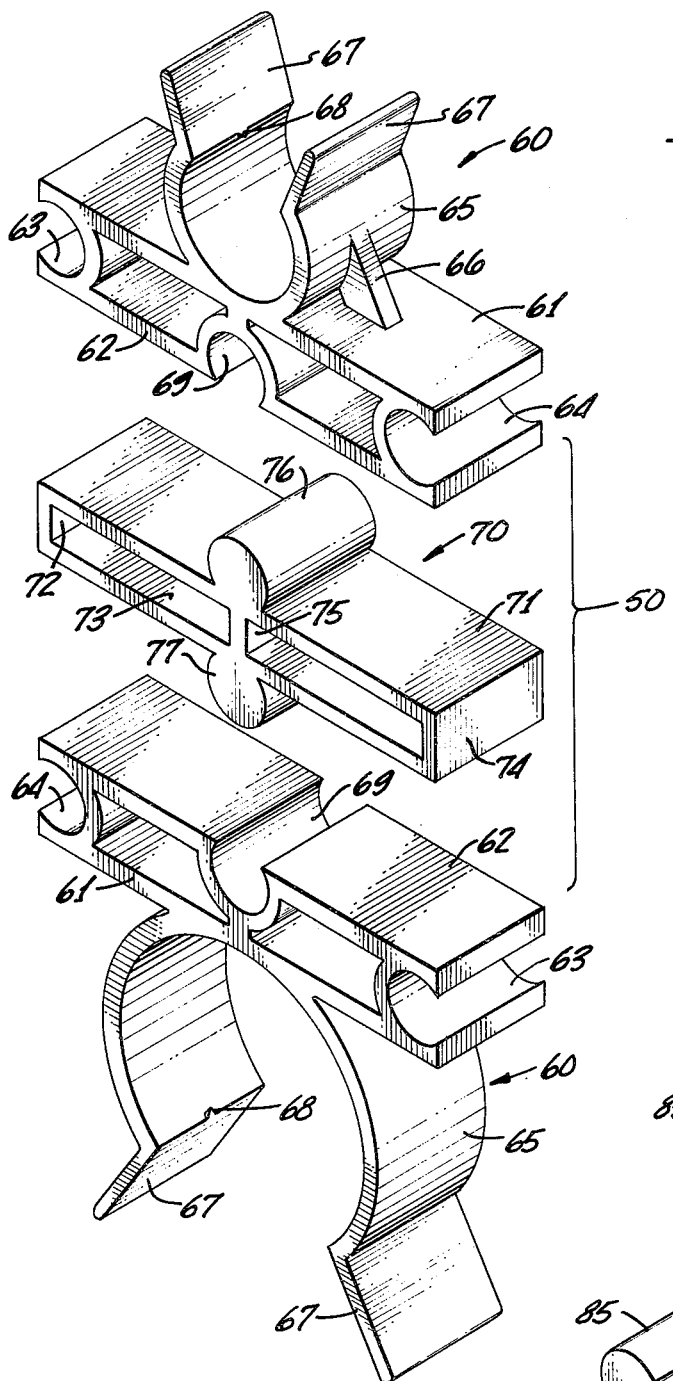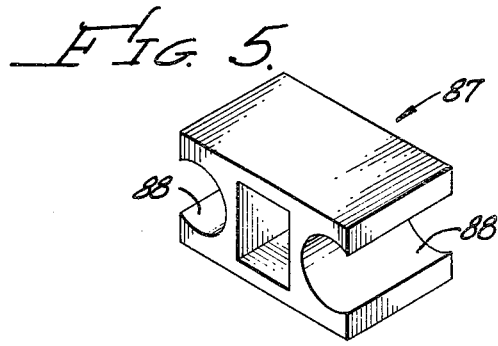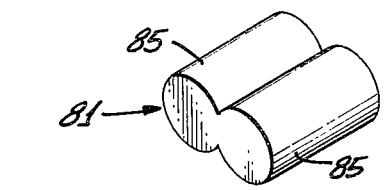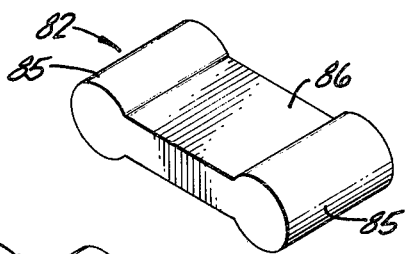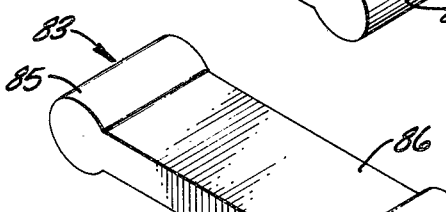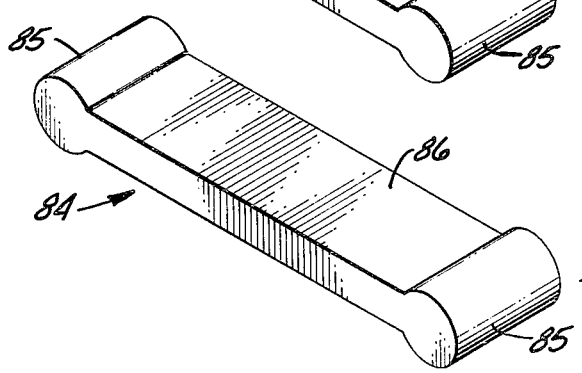

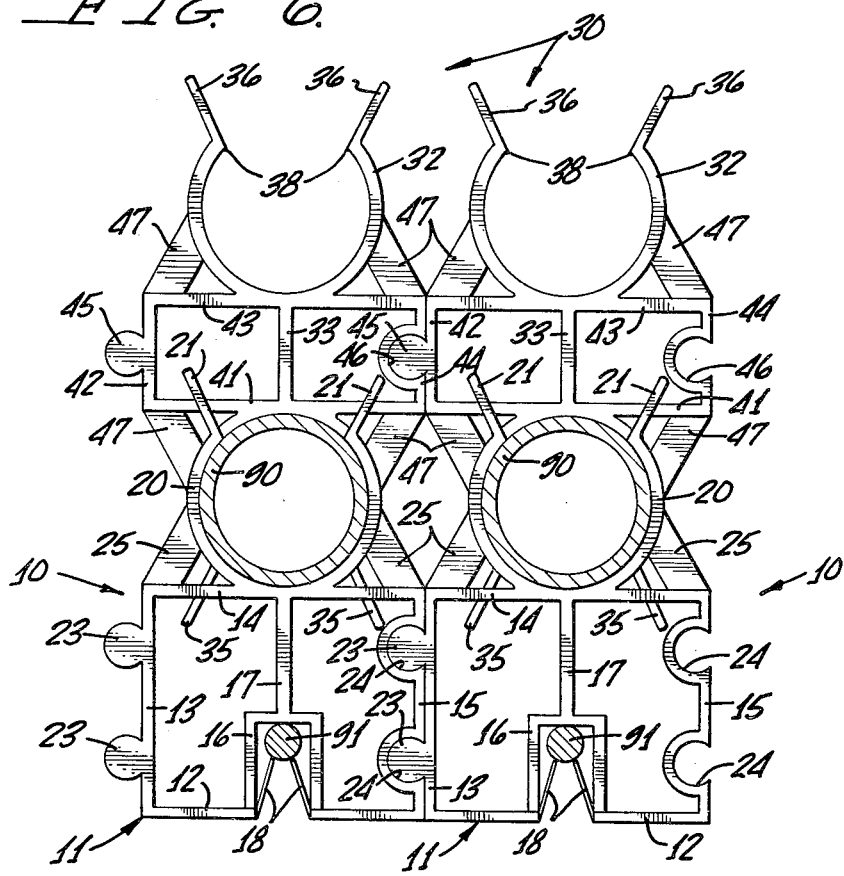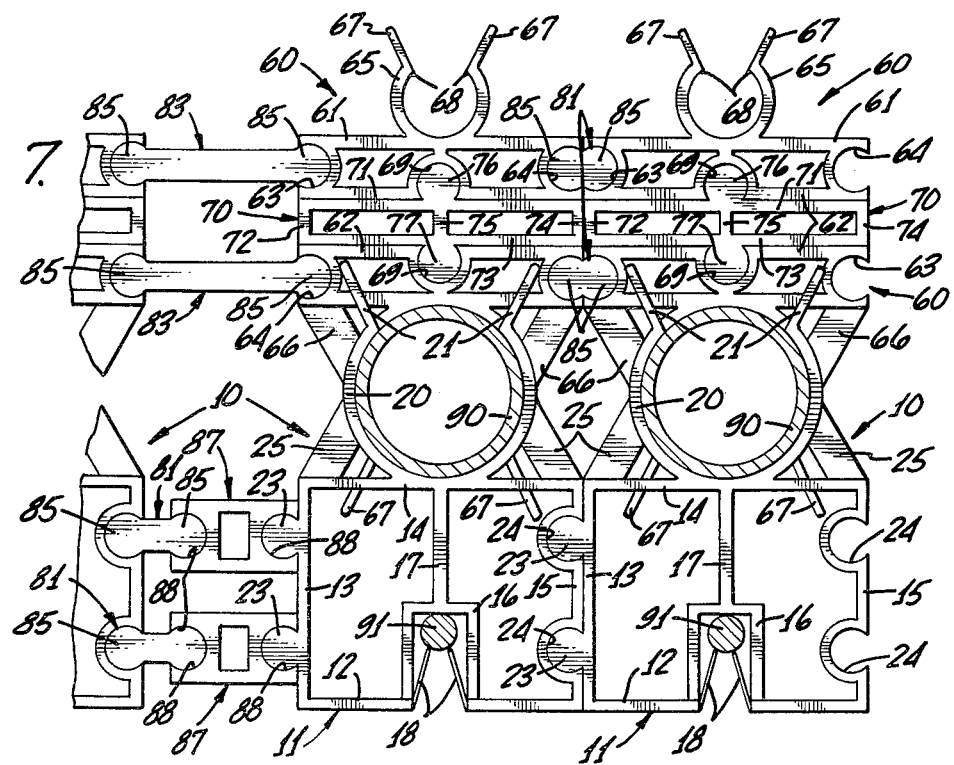

CONDUIT SPACER SYSTEM

BACKGROUND OF THE INVENTION

1. Field of the Invention

The present invention relates to an improved conduit spacer system and, more particularly, to base and intermediate units for supporting a plurality of conduits and for maintaining horizontal and vertical separation between such conduits.

2. Description of the Prior Art

In a conventional underground installation of electrical cables, the cables are run through conduits placed in a ditch and imbedded in concrete. These conduits generally are less than six inches in diameter. Utility company specifications and municipal code requirements often set forth a minimum spacing between adjacent conduits in a ditch and between each conduit and the bottom and sides of the ditch. Typical minimum spacings range from one and one-half inches to three inches. Therefore, one cannot simply place the conduits in a ditch without some means for maintaining the required separation therebetween.

In the past, base plates or spacers have been used to support electrical conduits above the floor of a ditch and/or to maintain separation between adjacent conduits. A problem encountered with base plate-type supports is that as concrete is being poured into the ditch to imbed the conduits, the force of the concrete tends to shift the position of the conduits on the base plates. Thus, to ensure that the minimum required separation will be maintained while pouring the concrete, it is often necessary to tie the conduits to the base plates. Such a tying operation is time-consuming and hence adds considerably to the cost of an underground conduit installation.

Another approach of the prior art has been to provide coupling collars at the joints between adjacent conduit sections. These coupling collars are generally square in shape, typically having a cradle at the top for receiving another conduit. Such coupling collars have significant disadvantages. For example, they can be used only at the intersection of adjacent conduit sections, thus significantly limiting their placement within a ditch. Moreover, each conduit must be placed carefully in the ditch atop the cradle of the subsequent conduit and such operation is time-consuming and adds considerably to the cost of an underground conduit installation.

In my U.S. Pat. No. 3,643,005, there is disclosed a unitary spacer for maintaining separation between electrical conduits in a ditch. Such spacer comprises a short tubular section having an inner diameter slightly larger than the outer diameter of the conduit with which the spacer is employed and an annular disc-shaped portion which extends radially outwardly from the tubular section and is provided at the periphery with a flanged rim. The rim supports the spacer-conduit assembly while the tubular section maintains the spacer perpendicular to the conduit at all times. Such a spacer readily may be slid over a conduit and positioned anywhere along the length thereof. Since the spacer is circular, minimum spacing is ensured between adjacent conduits or between the conduits and the wall or floor of the ditch, even though the conduit is not carefully placed in the ditch or shifts in position during pouring of the concrete.

While the spacer of my prior patent is a significant improvement over spacers used heretofore, users thereof often have two objections thereto. The first is that it is not convenient to stack conduits one above the other using such a unitary spacer. Secondly, the spacer must be slid over a conduit from the end thereof and this is often inconvenient when installing long conduits.

In my U.S. Pat. No. 4,183,484, there is disclosed a conduit spacer rack comprising a plurality of units which may be interconnected to form a rack for supporting a plurality of conduits in parallel, spaced-apart relationship. Each of the units comprises four generally coplanar arms emanating from a central hub in mutually orthogonal directions, first and second adjacent arms having a predetermined width and thickness, third and fourth adjacent arms forming channels at the free ends thereof, the width and depth of the channels formed in the third and fourth arms being approximately the same as the width and thickness of the first and second arms whereby the third and fourth arms are adapted to receive the first or second arms of adjacent units. Such units may be readily assembled into a rack to stack any number of conduits, one above another.

While the modular conduit spacer rack of my later prior patent is also a significant improvement over spacers used heretofore, one problem prevalent with virtually all prior art spacers, including the spacers of my prior patents, is that the spacers must be assembled for use with conduits. The assembly procedure is time-consuming and, with the escalating cost of labor, results in a significant labor element in the total cost of an underground conduit installation. Accordingly, the industry is presently searching for a spacer system which can be assembled very rapidly and conveniently to minimize the cost of an underground conduit installation.

In my copending patent application Ser. No. 045,303, filed June 4, 1979, and entitled Conduit Spacer System, there is disclosed a system for supporting a plurality of conduits above another in parallel, spaced-apart relationship including a base unit for supporting the bottom conduit, the base unit comprising a base and a U-shaped member having an open end for receiving the bottom conduit and supporting same, and an intermediate unit including first and second U-shaped members, the open ends of which extend in opposite directions whereby an intermediate unit can be pushed down onto one conduit and positioned to support another conduit thereabove. By continuing this process, multiple conduits can be supported and spaced one above another. Each unit includes matching interlocking means attached to opposite sides thereof whereby adjacent units may be interconnected to support multiple columns of conduits with a desired horizontal spacing.

While the conduit spacer system of my copending application represents a significant improvement over spacers used heretofore, users thereof often have several objections thereto. The first is that when lowering a conduit into a ditch onto a series of intermediate units, too much time is often taken in locating the conduits correctly. Secondly, while it is relatively easy to push a conduit into an intermediate unit or a base unit to be supported thereby, it is similarly easy to remove the conduits therefrom and this often occurs when concrete is poured into a ditch and the conduits float upwardly. Thirdly, it is not convenient to stack different sizes of conduits one above the other, or to vary the horizontal spacing between adjacent columns of conduits.

SUMMARY OF THE INVENTION

In accordance with the present invention, there is provided a system for supporting a plurality of conduits above another which solves all of the problems discussed above. The present spacer system includes a multiplicity of units which may be used to support a plurality of conduits of different sizes in parallel, spaced-apart relationship with a minimum vertical and horizontal spacing between the conduits and the floor and walls of a ditch. The units of the present system are self-supporting so there is no tendency for the concrete to disassemble same when poured into a ditch. Furthermore, the units of the present system lock the conduits thereinto so there is no tendency for the concrete to remove the conduits from the units when concrete is poured into a ditch.

The units need not be placed in any particular position along the conduits and need not be slid on from the ends of the conduits. The units of the present system are extremely simple and convenient to use and help locate the conduits as they are lowered into a ditch so that an installation of any number of conduits can be done extremely simply and rapidly. With the present system, conduits of different sizes can be stacked above each other and various horizontal spacings may be accommodated. Thus, use of the present system will substantially reduce the cost of an underground conduit installation.

Briefly, the present system for supporting a plurality of conduits above another in parallel, spaced-apart relationship includes a base unit for supporting the bottom conduit, the base unit comprising a base and a generally U-shaped member having an open end for receiving the bottom conduit and supporting same, and an intermediate unit including first and second U-shaped members, the open ends of which extend in opposite directions whereby an intermediate unit can be pushed down onto one conduit and positioned to support another conduit thereabove. Both the base unit and the intermediate unit include means for guiding conduits into the U-shaped members thereof and means for locking conduits therein after being located. The intermediate unit also comes in modular form to permit interconnecting of different sizes of conduits. Each unit includes matching interlocking means attached to opposite sides thereof whereby adjacent units may be interconnected to support multiple columns of conduits with a desired horizontal spacing.

OBJECTS, FEATURES AND ADVANTAGES

It is therefore an object of the present invention to solve the problems resulting from time-consuming assembly procedures in the use of conduit spacers which add significant labor costs to underground conduit installations. It is a feature of the present invention to solve these problems by providing a highly simplified conduit spacer system including a base unit and intermediate units which are adapted to readily receive conduits for spacing same in parallel, spaced-apart relationship. An advantage to be derived is that conduits may be stacked in a ditch simply and rapidly. A further advantage is that the necessary minimum spacing between conduits is maintained. A still further advantage is that this minimum spacing may be varied as required. Another advantage is that the present units are self-supporting. Still another advantage is that the units may be positioned any place along the lengths of the conduits. Still another advantage is that concrete will readily flow through each unit. Still another advantage is that the conduits are locked in the units and will not float therefrom when concrete is poured into a ditch. Still another advantage is that conduits of different sizes may be stacked.

Still other objects, features and attendent advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

BRIEF DESCRIPTION OF THE DRAWINGS

FIG. 1 is a perspective view of the base unit of the present conduit spacer system;

FIG. 2 is a perspective view of one embodiment of intermediate unit of the present conduit spacer system;

FIG. 3 is a perspective view of a second embodiment of intermediate unit of the present conduit spacer system;

FIGS. 4 and 5 are perspective views of horizontal couplings for use with intermediate units of the type shown in FIG. 3; and FIGS. 6 and 7 are sectional views showing the use of the units of the present invention in stacking a plurality of conduits above another in parallel, spaced-apart relationship.

DESCRIPTION OF THE PREFERRED EMBODIMENTS

Referring now to the drawings and, more particularly, to FIG. 1 thereof, there is shown a base unit, generally designated 10, which is a part of the present system for supporting a plurality of conduits above another in parallel, spaced-apart relationship. More specifically, base unit 10 comprises a generally rectangular base 11, including four sides 12, 13, 14 and 15, all of which have approximately the same thickness except for side 12 which is significantly wider in that side 12 is adapted to be positioned on the floor of a ditch. Side 12 has an inverted U-shaped section 16 and a reinforcing member 17 extends from section 16 to side 14. For reasons which will appear more fully hereinafter, a pair of arms 18 extend inwardly and upwardly from the ends of U-shaped section 16.

Base unit 10 also includes a generally U-shaped member 20 having an open end and an inside diameter approximately equal to the outside diameter of a conduit to be supported thereby. The center of U-shaped member 20 is made integral with side 14 of base 11 so that the open end of member 20 extends away from base 11. The plane of member 20 is parallel to the plane of base 11.

It is significant to note that member 20 is generally circular in shape, following the contour of a conduit to be supported thereby, with the spacing between the open ends of member 20 being less than the outside diameter of the conduits to be supported thereby. Furthermore, base unit 10 is preferably molded in one piece by an injection molding process from a resilient plastic material. This permits spreading of the arms of member 20 for receipt of conduits therebetween whereby member 20 may be snapped onto conduits to be supported thereby.

In order to help locate a conduit as it is lowered in a ditch and to direct it into the space between the ends of member 20, base unit 10 includes a pair of arms 21 which extend upwardly and outwardly from the open ends of member 20. This increases the "target area" when lowering a conduit into a ditch.

At the intersection between the open ends of member 20 and arms 21, member 20 is provided with a pair of inwardly and downwardly extending teeth 22. Teeth 22 dig into a conduit once it is located within member 20 to prevent the removal of the conduit from member 20. This prevents conduits from floating out of base unit 10 when concrete is poured into a ditch. In an actual test with a four-inch pipe, it was found that the addition of teeth 22 more than doubled the force required to pull a conduit out of member 20 as compared to the force necessary to push it into member 20.

If base unit 10 were to be used solely to support a single column of conduits, it could include base 11, member 20, arms 21 and teeth 22 only. However, the present system is also intended to support plurality of columns of conduits in parallel spaced-apart relationship. Therefore, in order to interlock adjacent base units 10 and to provide for a minimum horizontal separation between adjacent conduits, each base unit 10 includes matching interlocking means attached to opposite sides thereof.

More specifically, base 11 includes a pair of generally cylindrical tongue members 23 made integral with side 13 thereof and a pair of generally cylindrical groove members 24 made integral with side 15 thereof. Tongue members 23 have the same general dimensions and shapes as groove members 24. Accordingly, and as shown in FIG. 6, multiple base units 10 may be positioned in parallel, side-by-side relationship with the tongue member 23 of one base unit 10 engaging the groove member 24 of an adjacent base unit 10. This permits multiple base units 10 to be interconnected to support the bottom conduits of a plurality of columns of conduits with a desired spacing maintained between horizontally spaced conduits.

All of the elements of base unit 10 just described with the exception of side 12 of base 11 have the same width and, as described previously, base unit 10 is preferably molded in one piece by an injection molding process. This highly simplifies the manufacture of base units 10 and provides for the mass production thereof. Obviously, base unit 10 will be made with member 20 having a diameter matching the diameter of the conduit it is to support.

In order to provide support for the arms of member 20 to prevent warping thereof due to the forces placed upon them in use, base unit 10 preferably includes a pair of stiffening members 25 which are made as an integral part thereof during the molding process. Stiffening members 25 take the form of a pair of webs which extend between the arms of member 20 and side 14 of base 11.

Referring now to FIG. 2, there is shown an intermediate unit, generally designed 30, which is part of the present system for supporting a plurality of conduits above another in parallel, spaced-apart relationship. Intermediate unit 30 is generally similar to base unit 10 but is designed for supporting one conduit above another conduit while maintaining a minimum separation between vertically spaced conduits. Intermediate unit 30 includes first and second generally U-shaped members 31 and 32, both having open ends and inside diameters approximately equal to the outside diameters of the conduits to be supported thereby. The diameters of members 31 and 32 need not be the same, but preferably they are. The spacing between the open ends of members 31 and 32 is less than the outside diameters of the conduits to be supported thereby. Unit 30 includes an arm 33 connected between members 31 and 32, perpendicular thereto, arm 33 supporting members 31 and 32 with the open ends thereof extending in opposite directions and with the planes of members 31 and 32 coplanar.

The general configuration of members 31 and 32 is the same as described previously with regard to base unit 10. That is, the open ends of members 31 and 32 have arms 35 and 36, respectively, connected thereto and teeth 37 and 38, respectively, are made integral therewith at the open ends of members 31 and 32.

As was the case with base unit 10, if intermediate unit 30 were to be used solely to support a single column of conduits, it could consist of elements 31–38 only. On the other hand, since it is preferred to provide intermediate unit 30 with the flexibility of supporting multiple columns of conduits, each intermediate unit 30 includes matching interlocking means attached to opposite sides thereof, whereby adjacent units 30 may be interconnected. More specifically, intermediate unit 30 includes a generally rectangular structure including sides 41, 42, 43 and 44 which extend around arm 33, between members 31 and 32. Arm 42 has a tongue member 45 made integral therewith and side 44 has a groove member 46 made integral therewith, members 45 and 46 being identical to members 23 and 24, respectively. In this manner, multiple units 30 may be positioned in parallel, side-by-side relationship, with the tongue member 45 of one intermediate unit 30 engaging the groove member 46 of an adjacent unit 30, as shown in FIG. 6. This permits multiple units 30 to be interconnected to support the upper conduits of a plurality of columns of conduits with a desired spacing maintained between horizontally spaced conduits.

As was the case with base unit 10, elements 31–46 of intermediate unit 30 all have the same width and are preferably molded in one piece by an injection molding process from a resilient plastic material. This highly simplifies the manufacture of units 30 and provides for the mass production thereof. Furthermore, in order to provide support for the various parts of intermediate unit 30, unit 30 preferably includes a plurality of stiffening members, specifically webs 47 which extend between sides 41 and 43 and members 31 and 32, respectively.

Referring now to FIG. 3, there is shown another type of intermediate unit, generally designated 50. Intermediate unit 50 is used whenever it is desired to stack a conduit of one size on top of a conduit of another size. Thus, intermediate unit 50 includes a pair of identical members 60 which have the general appearance of half of intermediate unit 30. That is, each member 60 includes a rectangular section including spaced, parallel sides 61 and 62 having groove members 63 and 64 formed at the opposite ends thereof. Member 60 also includes a generally U-shaped member 65 extending from side 61 and supported by webs 66. At the free ends of member 65 are arms 67 and teeth 68. A groove member 69 is also formed in side 62, facing in an opposite direction from member 65. Thus, a plurality of members 60 may be interconnected through use of a member 70 which includes a rectangular portion including sides 71, 72, 73 and 74 with an intermediate stiffening member 75, sides 71 and 73 having opposed tongue members 76 and 77, respectively, connected thereto. Thus, tongue members 76 and 77 are adapt to be positioned into groove member 69 in members 60 placed back-to-back to interconnect adjacent members 60. By making members 60 with members 65 having the different diameters corresponding to the different diameters of the conduits used, any pair of conduits with any diameters may be stacked vertically.

Referring now to FIGS. 4 and 5, it is sometimes desired to increase the horizontal spacing between adjacent columns of conduits. With the present invention, this may be achieved by the use of connector units 81, 82, 83 and 84. Such units are simply opposed tongue members 85 with a spacer bar 88 therebetween, which spacer bars 86 have different lengths. The tongue members 85 are adapted to engage the groove members in units 10, 30 and 60. Furthermore, if it is desired to connect units with facing groove and tongue members, a coupling 87 may be used having opposed groove members 88 which may be used to connect two facing tongue members. This is shown in FIG. 7.

In operation, the primary advantage of base unit 10 and intermediate units 30 and 50 is that they may be used to position a plurality of conduits 90 in a ditch in parallel, spaced-apart relationship in a rapid and simple manner. Specifically, if a simple column of conduits 90 is to be positioned on the floor of a ditch, a plurality of base units 10 may be positioned on the floor of the ditch in parallel, spaced-apart relationship with sides 12 resting on the floor of the ditch. A first conduit 90 is then brought into contact with the arms 21 of member 20 which direct the conduit to the open ends of members 20. The ends of members 20 have a spacing which is less than the outside diameter of conduit 90. However, since base units 10 are made from a resilient material, the arms of members 20 spread to permit entry of conduit 90 into members 20. Thus, with the simple action of pushing conduit 90 down onto base units 10, conduit 90 snaps into members 20 and assembly is completed. Furthermore, teeth 22 lock conduits 90 in units 10.

In order to position a second conduit 90 above the bottom conduit 90, a number of intermediate 30 or 50 have their lower U-shaped members 31 or 65 pushed down onto the bottom conduit 90. Again, the spacing between the ends of members 31, 32 and 65 is less than the outside diameter of conduit 90 to be used therewith, but the resiliency of the plastic material permits spreading of the arms of members 31, 32 and 65. Therefore, it is a simple matter to push a number of intermediate units 30 or 50 down onto a previously positioned conduit 90. Furthermore, the teeth 37, 38 or 68 hold the units onto the previously positioned conduit 90. Thereafter, with the open ends of U-shaped members 32 or 65 of all intermediate units 30 or 50 extending upwardly, a second conduit 90 may be pushed downwardly into members 32 or 65 as described previously with regard to the insertion of the bottom conduit 90 into members 20 of base units 10.

Obviously, this procedure may be repeated whereby each conduit 90 supports a plurality of intermediate units 30 or 50, which units 30 or 50 support the next conduit 90. The result is that a plurality of conduits 90 may be assembled in a column in a ditch in a very rapid manner.

The procedure for assembling a plurality of columns of conduits 90 is virtually identical to that described for a single column. The only difference is that adjacent units are first interconnected before being positioned in the ditch as described previously. Otherwise, the procedure is identical. Completed assemblies are shown in FIGS. 6 and 7. It should be obvious that one of the reasons for the speed with which units 10, 30 and 50 may be installed is the fact that they can be positioned anywhere along the lengths of conduits 90.

Many municipal codes are now requiring that spacers of the type described herein have reinforcing bars, commonly referred to as rebars, positioned therein. The present invention provides for this by means of recess 16 and arms 18 in units 10. More specifically, before positioning base units 10 on the floor of a ditch, a rebar 91 is put along the floor of the ditch directly below where the conduits will be placed. As the base units 10 are positioned on the floor of the ditch, this is done so that the rebar extends beneath recess 16. After the conduits are placed in the ditch so that the base units 10 are firmly held on the floor thereof, the rebars 91 are elevated. This is achieved simply by grasping the ends thereof or an intermediate point along the lengths thereof. Upward movement of the rebars 91 spread arms 18 until rebars 91 pass the ends of arms 18. At this point, arms 18 snap towards each other, supporting the rebars so that they can not fall downwardly. Such a configuration satisfies all present municipal code requirements for supporting rebars.

After all of the units and conduits are positioned in a ditch, concrete may be readily poured into the ditch for embedding the conduits. The concrete readily flows through the openings in units 10, 30 and 50 so that there are no cracks formed. Furthermore, there is no tendency for the units to shift relative to conduits 90. Furthermore, the teeth 22, 37, 38 and 68 formed in the supporting units firmly attach the supporting units to conduits 90 to prevent conduits 90 from floating out of the support units as the concrete is poured into the ditch.

It can therefore be seen that in accordance with the present invention, there is provided a system for supporting a plurality of conduits 90 above another which solves all of the problems discussed hereinabove. The present spacer system includes a multiplicity of units which may be used to support a plurality of conduits 90 of different sizes in parallel, spaced-apart relationship with a minimum vertical and horizontal spacing between the conduits and the floor and walls of a ditch. The units of the present system are self-supporting so there is no tendency for the concrete to disassemble same when poured into a ditch. Furthermore, the units of the present system lock the conduits thereinto so there is no tendency for the concrete to remove the conduits from the units when concrete is poured into a ditch.

The present units need not be placed in any particular position along conduits 90 and need not be slid on from the ends thereof. The units of the present system are extremely simple and convenient to use and help locate conduits 90 as they are lowered into a ditch so that an installation of any number of conduits can be done extremely simply and rapidly. With the present system, conduits of different sizes can be stacked above each other and various horizontal spacings may be accomodated. Thus, use of the present system will substantially reduce the cost of an underground conduit installation.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. A unit for supporting a conduit comprising:
   a base;
   a U-shaped member having an open end and a diameter approximately equal to the outside diameter of said conduit, the spacing between the open ends of said U-shaped member being less than the outside diameter of said conduit, the opposed arms of said member being made from a resilient material to permit spreading thereof for receipt of a conduit therebetween;
   a pair of inwardly and downwardly extending teeth formed in the open ends of said U-shaped member for inhibiting removal of said conduit from said U-shaped member; and
   means interconnecting said base and said U-shaped member with said open end of said member extending away from said base;
   said base including:
      an inverted U-shaped section extending in an opposite direction from said U-shaped member; and
      a pair of arms extending inwardly and upwardly from the ends of said U-shaped section for supporting a reinforcing bar therein.

2. A unit for supporting one conduit above another conduit in parallel, spaced-apart relationship comprising:
   a first U-shaped member having an open end and a diameter approximately equal to the outside diameter of said one conduit;
   a second U-shaped member having an open end and a diameter approximately equal to the outside diameter of said another conduit, said first and second U-shaped members being separate pieces, the spacing between the open ends of said first and second U-shaped members being less than the outside diameter of the conduits to be supported thereby, the opposed arms of said first and second U-shaped members being made from a resilient material to permit spreading thereof for receipt of conduits therebetween;
   a pair of inwardly and downwardly extending teeth made integral with said open ends of said first and second U-shaped members, said teeth being adapted to engage said conduits to inhibit removal of conduits from said members; and
   means releasably interconnecting said first and second U-shaped members with said open ends thereof extending in opposite directions and the planes of said members coplanar.

3. A system for supporting a plurality of conduits above another in parallel, spaced-apart relationship comprising:
   a first unit for supporting a first conduit comprising:
      a base;
      a first U-shaped member having an open end and a diameter approximately equal to the outside diameter of a conduit to be supported thereby;
      first means interconnecting said base and said first member with said open end of said first member extending away from said base;
      first matching interlocking means attached to opposite sides of said first unit for interconnecting adjacent first units; and
   a second unit for supporting a second conduit above said first conduit comprising:
      a second U-shaped member having an open end and a diameter approximately equal to the outside diameter of said second conduit;
      a third U-shaped member having an open end and a diameter approximately equal to the outside diameter of said first conduit;
      second means interconnecting said second and third U-shaped members with said open ends thereof extending in opposite directions and the planes of said second and third members coplanar; and
      second matching interlocking means attached to opposite sides of said second unit for interconnecting adjacent second units; and
   the spacing between the open ends of said first, second and third U-shaped members being less than the outside diameter of the conduits to be supported thereby, the opposed arms of said first, second and third U-shaped members being made from a resilient material to permit spreading thereof for receipt of conduits therebetween; and
   connector means positionable between adjacent first or second units and engaging said first and second matching interlocking means for adjusting the horizontal spacing between adjacent first and second units.

* * * * *